(12) United States Patent
Sanford et al.

(10) Patent No.: US 6,256,028 B1
(45) Date of Patent: Jul. 3, 2001

(54) DYNAMIC SITE BROWSER (75) Inventors: John L. Sanford; Elisabeth Roberts, both of Seattle; Peter E. Durham, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/134,802

(22) Filed: Aug. 14, 1998

(51) Int. Cl.[7] ................................................. G06F 13/00
(52) U.S. Cl. ............................................. 345/353; 345/357
(58) Field of Search ..................................... 345/326, 329, 345/335, 339, 340, 352, 353, 356, 357; 709/203, 217, 219

(56) References Cited

U.S. PATENT DOCUMENTS

| | | | |
|---|---|---|---|
| 5,572,643 | * | 11/1996 | Judson ................................. 709/218 |
| 5,742,768 | * | 4/1998 | Gennaro et al. ..................... 709/203 |
| 5,801,702 | * | 9/1998 | Dolan et al. ......................... 345/357 |
| 5,805,815 | * | 9/1998 | Hill ....................................... 709/218 |
| 5,890,172 | * | 3/1999 | Borman et al. ...................... 707/501 |
| 5,917,491 | * | 6/1999 | Bauersfeld ........................... 345/352 |
| 5,933,599 | * | 8/1999 | Nolan .................................. 345/329 |
| 5,963,208 | * | 10/1999 | Dolan et al. ......................... 345/357 |
| 5,996,007 | * | 11/1999 | Klug et al. ........................... 709/218 |
| 6,023,701 | * | 2/2000 | Malik et al. ........................... 707/10 |

* cited by examiner

Primary Examiner—Crescelle N. dela Torre
(74) Attorney, Agent, or Firm—Christensen O'Connor Johnson Kindness PLLC (57) ABSTRACT

A method, system and computer-readable medium for allowing easier access of web pages of a web site is provided. A requested web page is downloaded with a site browser and datafile assigned the web site. The site browser includes a version identifier and the datafile includes a timestamp. A set of left-to-right cascading menus are generated based on the downloaded site browser and datafile. The datafile is a hierarchical data structure comprising titles of the web site's web pages and links to the titled web pages. The site browser and datafile are automatically updated, if it is determined that more current versions exist.

36 Claims, 7 Drawing Sheets

```
GMT=1998.07.22 22.02
VER=02.00
SECTIONID=NEWS
URL=182112.ASP
HEADLINE=ASTRONAUT ALAN SHEPARD DIES AT 74
CLEANHEADLINE=ASTRONAUT ALAN SHEPARD DIES AT 74
ABSTRACT=ASTRONAUT ALAN SHEPARD, THE FIRST AMERICAN TO FLY IN SPACE AND ONE OF ONLY
CLEANABSTRACT=ASTRONAUT ALAN SHEPARD, THE FIRST AMERICAN TO FLY IN SPACE AND ONE OF
PDT=WED, 22 JUL 1998  14:49:00  GMT
BROWSEORDER=1,0,0
KEYWORDS=
END
SECTIONID=NEWS
URL=179692.ASP
HEADLINE=SOME RELIEF FROM THE HEAT EXPECTED
CLEANHEADLINE=SOME RELIEF FROM THE HEAT EXPECTED
ABSTRACT=THE U.S. HEATWAVE IS NOW BLAMED FOR 129 DEATHS IN SEVEN STATES AND AS PEOPLE
CLEANABSTRACT=THE U.S. HEATWAVE IS NOW BLAMED FOR 129 DEATHS IN SEVEN STATES AND A
PDT=MON, 13 JUL  1998  23:21:00  GMT
BROWSEORDER=2,1,0
KEYWORDS=
END
```

*Fig.1.* *(PRIOR ART)*

DATE=08/15/1997
TIME=09:57 AM
F=1
S=WLD
U=WLD_FRONT.ASP
H=WORLD FRONT PAGE
B=0
E
S=WLE
U=90863.ASP
H=UPS, TEAMSTERS 'CRUNCH NUMBERS'
B=1
E
S=WLD
U=93499.ASP
H=2ND NEW YORK COP COULD BE ARRESTED
B=2
E

*(Figure showing two browser windows displaying news page content with reference numbers 200, 202, 204, 206, 208, 210, 212, 316)*

DYNAMIC SITE BROWSER

FIELD OF THE INVENTION

This invention relates to web sites and, more particularly, to user navigation through a web site.

BACKGROUND OF THE INVENTION

Web sites, i.e., sites on the World Wide Web, that provide access to multiple web pages separated into multiple topic areas provide vast amounts of information in one central location. The web pages can include documents, articles, graphics, animation, sound, etc. that have particular relevance to a topic area of the web site. Hyperlinks to web pages with articles are placed in topic area web pages that are accessed from a base web page. For example, a news web site, e.g. MSNBC.com, includes a home page with hyperlinks to topic area web pages, such as business and sports. The topic area web pages include hyperlinks to web pages with articles, etc. pertinent to the topic area web page. A topic area web page can also include hyperlinks to subtopic area web pages that include hyperlinks to still other web pages.

In the past, user navigation through the type of web sites described above has been quite tedious because a user has only been able to access a desired web page from the topic, subtopic or other web page that contains a hyperlink to the desired web page. For example, assume that a user has just finished reading a baseball game summary contained on a web page that was accessed via a hyperlink included on a subtopic web page titled "Baseball" that was accessed via a hyperlink included on a topic web page titled "Sports" that was accessed via a hyperlink included in a topic web page titled "News". If such a user wants to read an article on the President that is located on a web page that is reached via a hyperlink included on the subtopic web page titled "Government" that is reached via a hyperlink included on the topic web page titled "News", the user would have to back out to the baseball summary web page through the "Baseball" and "Sports" web pages to the topic web page titled "News" and, then, access the subtopic web page titled "Government" followed by accessing the web page with the article on the President. Often web sites have links to the top-level categories (topic areas) on each of the web pages, thereby removing the need for the upward journey through the hierarchy, but the subsequent downward journey is still required.

Topic and subtopic web pages within a web site are still the primary location for hyperlinks that give access to multiple web pages with articles. As a result, topic or subtopic web pages tend to be longer than what can appear on a single screen. When web pages are longer than what can appear on a single screen, a viewer must scroll the page in order to view all the hyperlinks to web pages containing articles. In usability studies scrolling has be shown to be an underutilized resource. As a result, many web pages are not accessed simply because users do not scroll through web pages to locate the included hyperlinks. This results in a loss of advertising revenue in situations where advertising revenue is tied to web page access. The more a web page is accessed by users, the more the owner of the web page can charge for advertising space on that web page.

Figure 1:
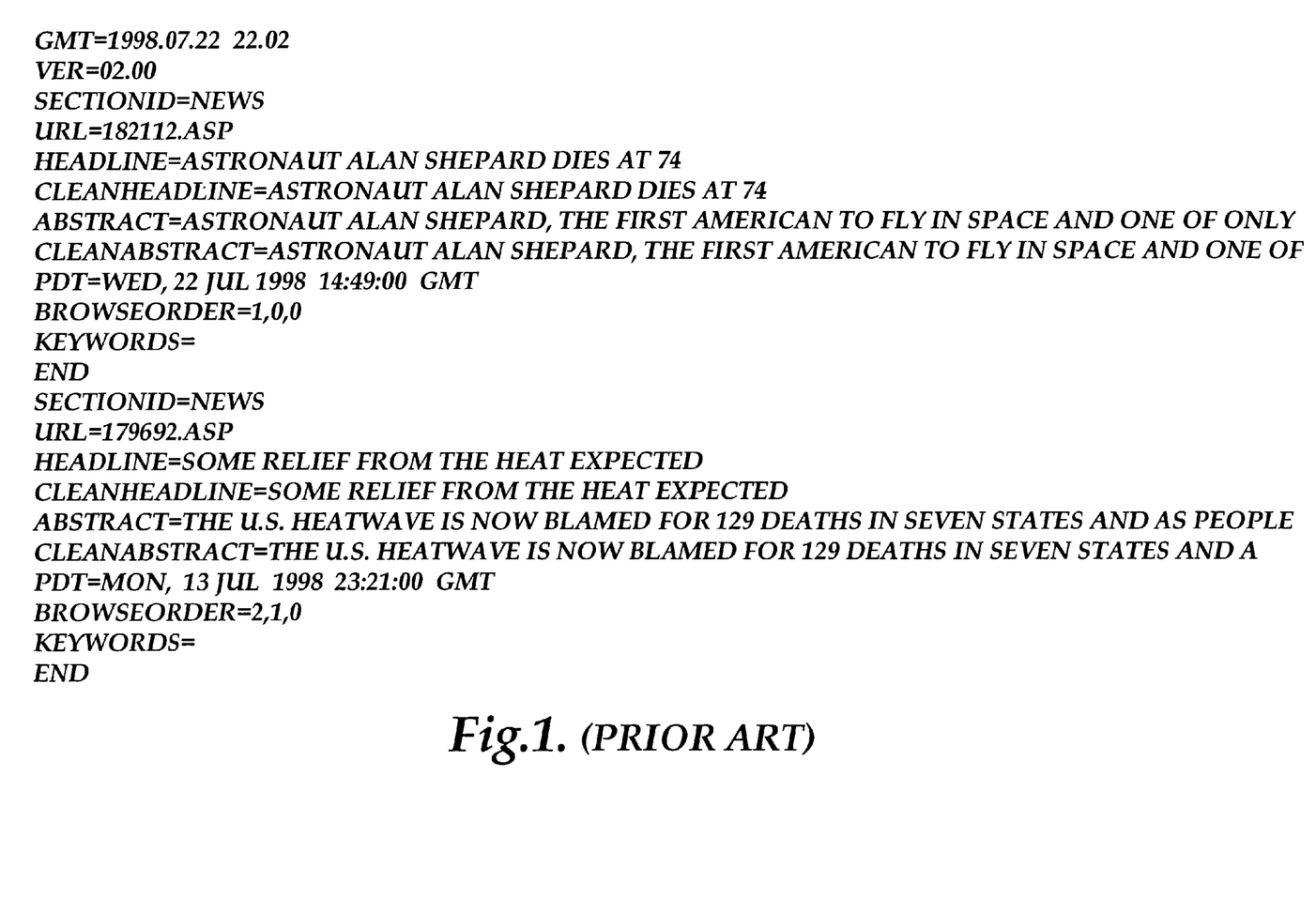
FIGS. 1 and 2 are example datafiles used in prior art implementations of a site browser.
Figure 2:
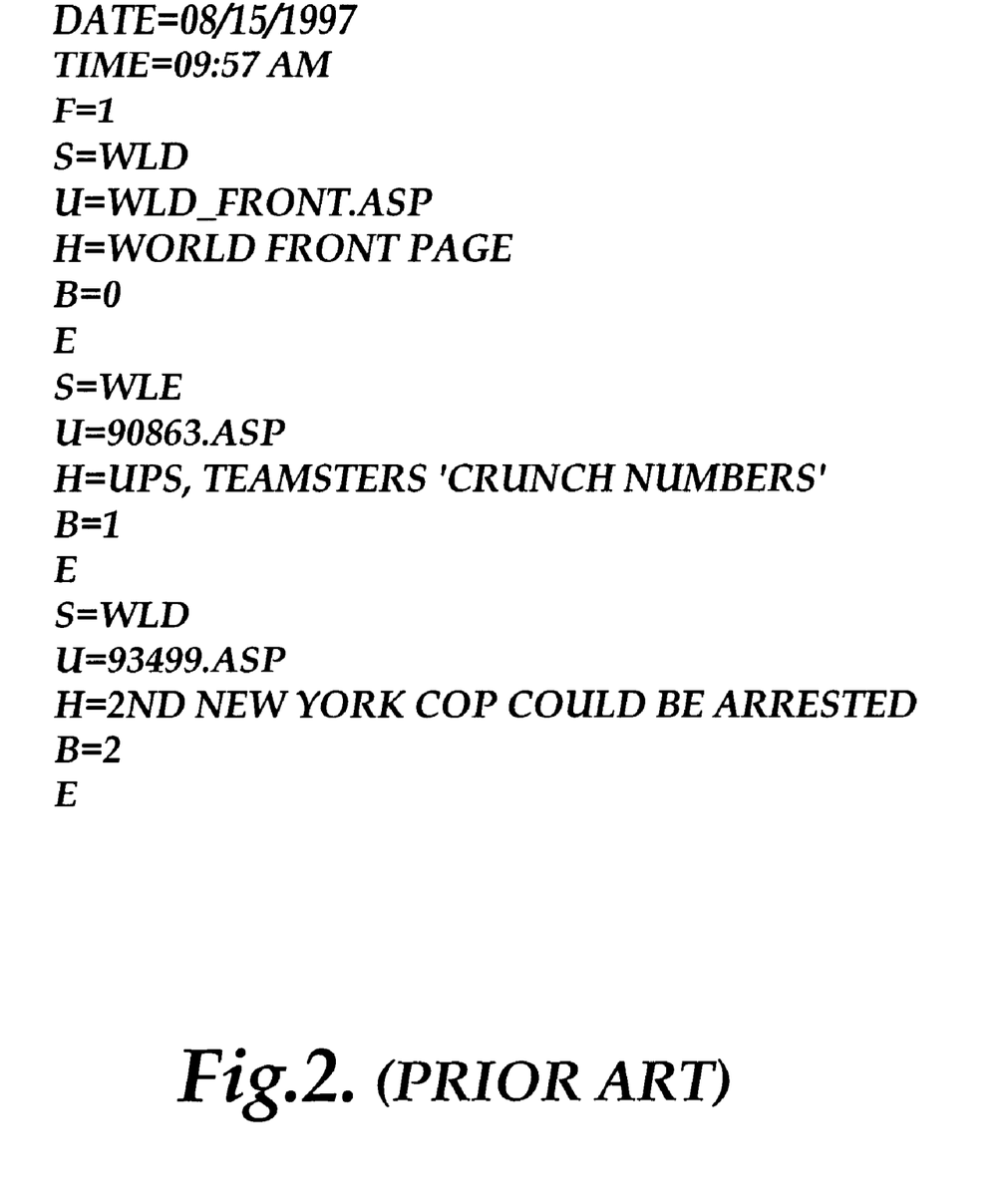

In a first attempt to resolve this lack of usability, a partial navigation feature was added to a web page to allow a user to directly access web pages in another part of the web site without having to progress through the web site as described above. This technique did not fully solve the problem, because the partial navigation feature contained access to only a portion of the articles in the web site and web pages were still being designed to require scrolling to provide access to many web pages. The reason why this navigation feature was only a partial navigation feature relates to the feature's use of a flat datafile to generate user interactive menus. Flat datafiles occupy a large amount of memory and take a significant amount of time to download. FIGS. 1 and 2 illustrate flat datafiles of the type used by this partial navigation feature. The datafiles are voluminous because each entry occupies multiple lines. One of the lines is designated for identifying where the entries headline would be located in user interactive menus generated by the partial navigation feature. A web site with a few hundred web pages may require a datafile a hundred or more pages long. A datafile of this size might take several minutes to download.

Accordingly, there is a need to provide user friendly access to all the web pages or articles on a web site without increasing download time. The present invention is directed to providing a software based method and apparatus for providing such access.

SUMMARY OF THE INVENTION

In accordance with the present invention, a method, system and computer-readable medium for allowing easier access to the web pages of a web site is provided. A requested web page is downloaded with a site browser and datafile assigned to the web site. The site browser includes a version identifier and the datafile includes a timestamp. A set of cascading menus are generated based on the downloaded site browser and datafile. The datafile is a hierarchical data structure comprising titles of the web site's web pages and links to the titled web pages.

In accordance with other aspects of the present invention, during downloading of a new web page from the web site, the version identifier of the previously received site browser is compared to a site browser version identifier attached to the downloading web page. If the site browser version identifier attached to the downloading web page is more current, a new site browser and datafile are downloaded. If the site browser version identifier attached to the downloading web page is not more current, the previously received site browser and datafile are used.

In accordance with still other aspects of the present invention, during downloading of a new web page from the web site, the server compares the timestamp of the last sent datafile to the timestamp of a present datafile. If the timestamp of a present datafile is more current, a new datafile is downloaded. If the timestamp of a present datafile is not more current, the last sent datafile is used.

In accordance with further aspects of the present invention, during downloading of a new web page from the web site, a file containing datafile timestamp assigned to the most recent datafile is requested. The datafile timestamp contained in the requested file is compared to a datafile timestamp assigned to the previously received datafile. If the datafile timestamp contained in the requested file is more current, a new datafile is downloaded. If the datafile timestamp contained in the requested file is not more current, the previously received datafile is used.

As will be readily appreciated from the foregoing summary, the invention provides a new and improved method, apparatus and computer-readable medium for improving user friendly access to web pages within a web site without increasing the downloading time of the web pages. The use of a hierarchical datafile that represents a web site improves download time and increases the usability of a browser for a web site.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As will be better understood from the following description, the present invention is directed to a method, system and computer-readable medium for allowing user friendly access to web pages within a web site without increasing downloading time of the web pages.

Figure 3:
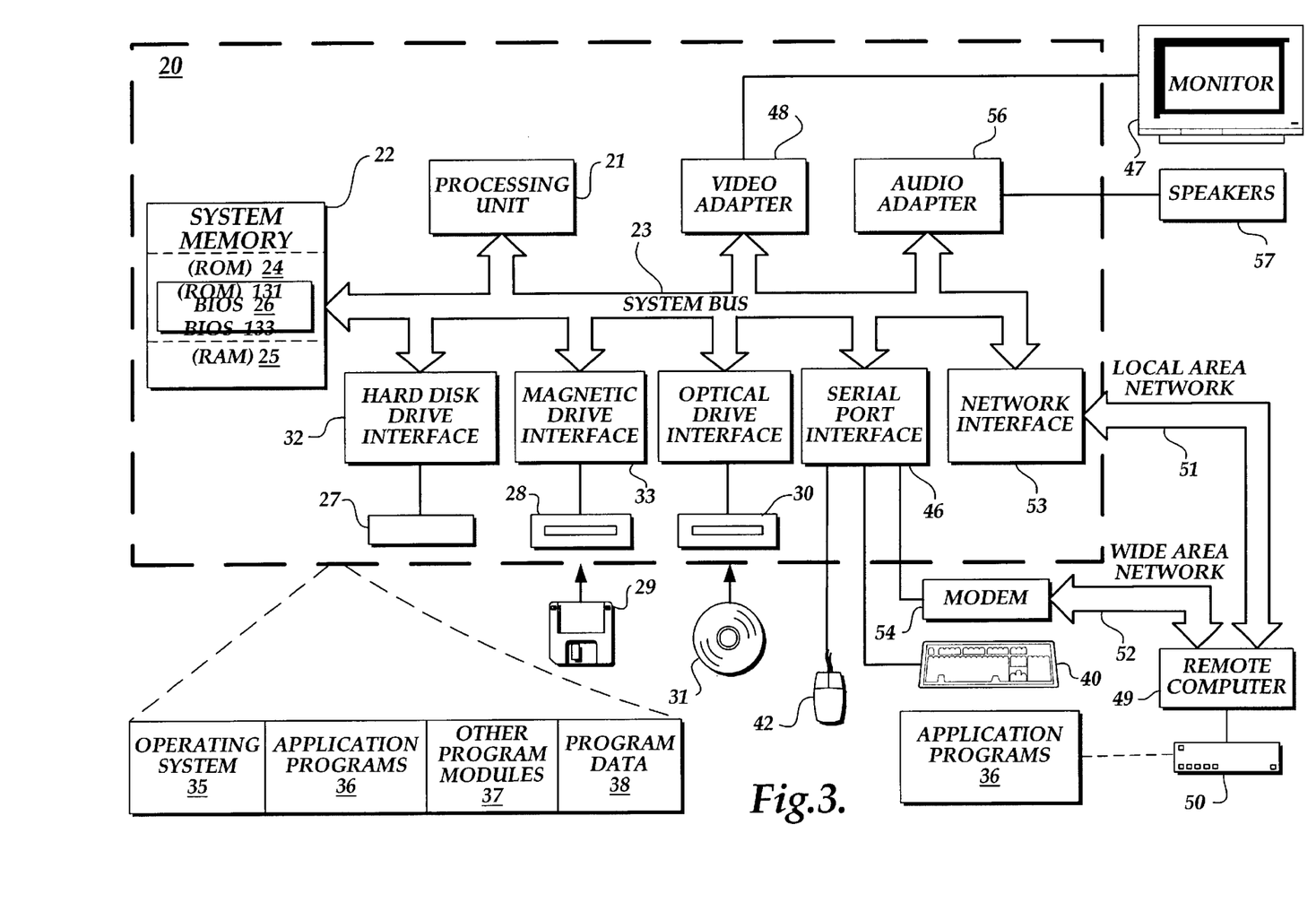
FIG. 3 is a block diagram of a general purpose computer system for implementing the present invention.

FIG. 3 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 3, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, RAMs, ROMs, and the like, may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may also be connected by other interfaces, such as a parallel port, game port or a universal serial bus (USB). A display 47 is also connected to the system bus 23 via an interface, such as a video adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 3. The logical connections depicted in FIG. 3 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof, may be stored in the remote memory storage device. It will be appreciated that the network connections shown are exemplary, and other means of establishing a communications link between the computers may be used.

The present invention, implemented on a system of the type illustrated in FIG. 3 and described above, provides dynamically updated cascading menus that allow one click access to any web page contained in a web site without increasing downloading time of the web pages. When a request is made for a web page included in a web site, the web page is downloaded. This request can be a manual request by a user (e.g., user enters the Universal Resource Locator (URL) for the web page) or can be an automatic request initiated by the user's system or by a remotely located server. For the purpose of defining the present invention, a web site is a collection of web pages (hypertext markup language (HTML) files or documents) that generally cover a plurality of topics and subtopics and are interconnected through hyperlinks. A web page is a HTML file that identifies associated files for graphics, text, etc. The web site includes a home page for initiating user focus to the web site.

Figure 4:
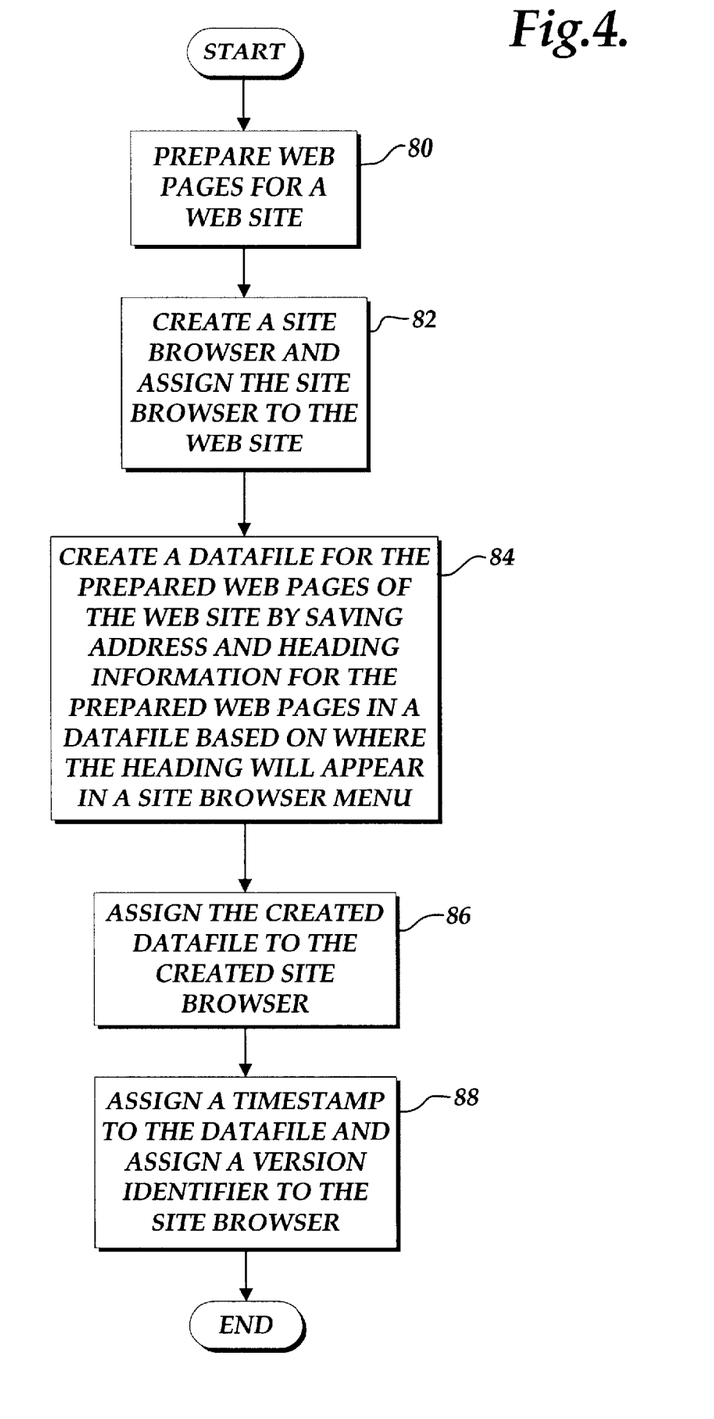
FIG. 4 is a flow diagram illustrating an example process for providing a site browser and datafile for a web site.

FIG. 4 illustrates a process performed by the publishers (i.e., authors, editors, illustrators, etc.) of a web site for assigning a site browser and datafile to the web site. The datafile is a file that includes address and headings for web pages of the web site. The datafile is structured in a tree-like manner (hierarchy) for the purpose of providing a simple file structure that will be used by the site browser to generate cascading menus. The structure of the datafile is described in more detail below by the example shown in FIG. 7. But, before the present invention is used on a user's system, the process shown in FIG. 4 is performed. First, at block 80, the web pages for the web site are prepared by the web page authors and the browse order or web page hierarchy that will appear in the datafile is determined. Then, at block 82, a site browser is created and assigned to the web pages of the web site. The site browser is computer code that will create a cascading menu using application program interface (API) calls to the windows-based operating system on the user's system based on the structure and contents of a datafile. If the site browser is created as separately executing code, such as an ActiveX control, a JAVA applet or other similarly functioning code, the site browser is attached to the web pages by including information into the web page's code that defines where the site browser is located. The entire site browser can also be scripted into the web page's code.

Still referring to FIG. 4, at block 84, a datafile is created for the prepared web pages by saving the address (e.g., URL) and heading information for the prepared web pages based on where the heading will appear in a cascading menu. The location where the heading will appear in the cascading menu is a choice made by the web site publisher. At block 86, the created datafile is assigned to the created site browser. The datafile is assigned by providing its address (e.g., URL) to the site browser. Finally, at block 88, a timestamp is assigned to the datafile and a version identifier is assigned to the site browser. The steps performed in the process described above do not have to be performed in the order shown, so long as the web pages of the web site are prepared to execute by the processes shown in FIGS. 5 and 6 and described below.

Figure 5:
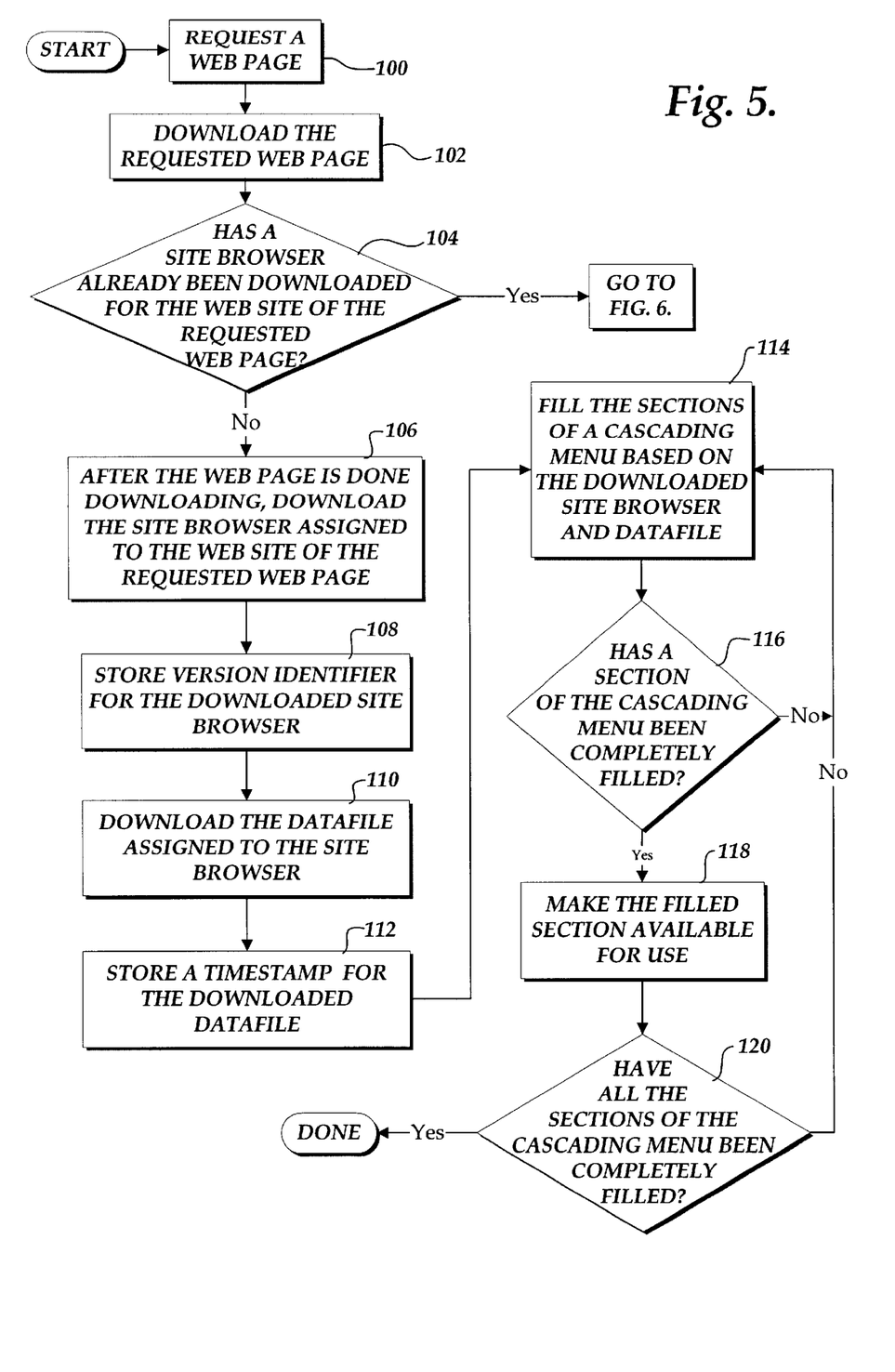
FIGS. 5 and 6 are flow diagrams illustrating example processes for accessing and updating the site browser provided by the present invention.

FIG. 5 illustrates an example process by which the present invention is implemented. First, at block 100, a request is made for any web page of a web site that includes a site browser formed in accordance with the present invention. At block 102, the requested web page is downloaded. At decision block 104, the process determines if the user's system already has a stored version of the site browser for the web site of the requested web page. If the user's system does include the web site's site browser, the process goes to FIG. 6 for possible updating. If the user's system does not include the web site's site browser, the process downloads the site browser assigned to the web site of the requested web page. See block 106. Then, at block 108, the version identifier for the downloaded site browser is stored for later comparison. Then, at block 110, the datafile is downloaded and, at block 112, the timestamp for the downloaded datafile is stored for later comparison. As will be readily appreciated by those skilled in web server processes, the site browser and datafile can also be downloaded before or during web page downloading. The purpose for delaying the site browser and datafile downloading until after the web page has been fully downloaded is to provide the user with view and interaction of the web page without delay.

Still referring to FIG. 5, at block 114, as the site browser datafile is being downloaded, the site browser fills sections or menus (hereinafter sections and menus are used interchangeably) of the cascading menu based on the downloaded datafile. When a section of the cascading menu has been completely filled, as shown by the decision performed in decision block 116, the filled section is made available to the user. See decision block 118. If no section has been completely filled or sections remain to be filled, as determined at decision block 120, the process returns to block 114 and the sections continue to be filled. When all the information has been downloaded and the last section of the cascading menus has been filled, the process is complete. The step performed at the decision block 116, is an inherent decision step, because the functions of filling sections and making filled sections available to a user are continuously performed tasks. While sections remain to be filled, the filling task will be performed and as soon as a section is filled, it is made available to the user.

Figure 6:
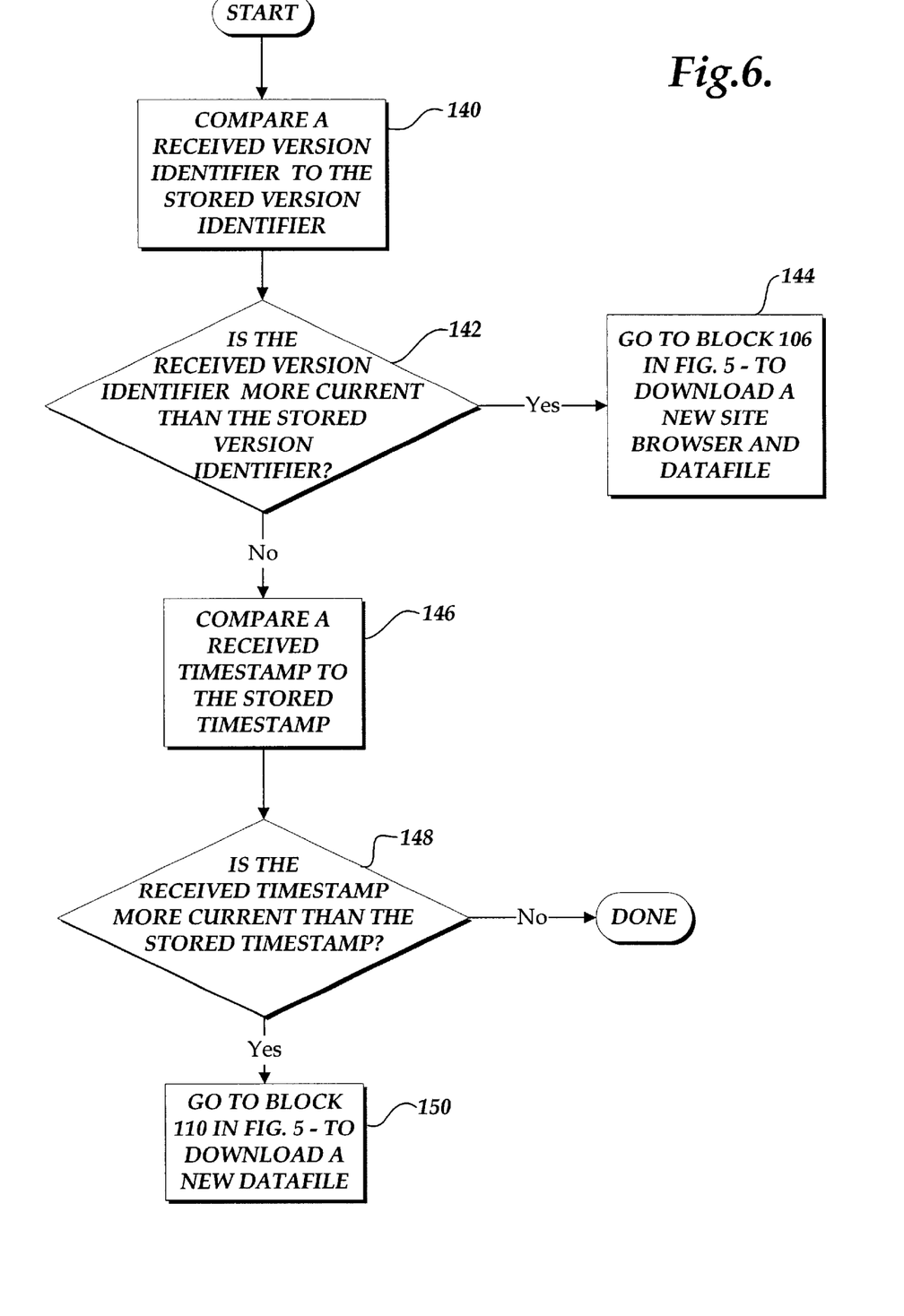

FIG. 6 illustrates an example process for automatically updating the cascading menu for a web site. The process performed in FIG. 6 occurs whenever it was determined, at decision block 104 of FIG. 6, that a site browser has already been downloaded. First, at block 140, the site browser version identifier attached to the presently downloading web page is compared, to the stored version identifier. Then, at decision block 142, if the site browser version identifier attached to the presently downloading web page identifies a more current version of the site browser, the process returns to block 106 in FIG. 5. See block 144. Otherwise, the process continues onto block 146 that includes the step of comparing the datafile timestamp attached to the presently downloading web page to the stored timestamp. This comparison may occur at the server, or the process may download a file containing the datafile timestamp to perform the comparison itself. If, at decision block 148, the result of the comparison is that the datafile timestamp attached to the presently downloading web page is not more current than the stored timestamp, the process is complete, because the user's system already has the most recent datafile. If the stored timestamp is determined to have a later dating, the process returns to block 110 in FIG. 5. See block 150.

Figure 7:
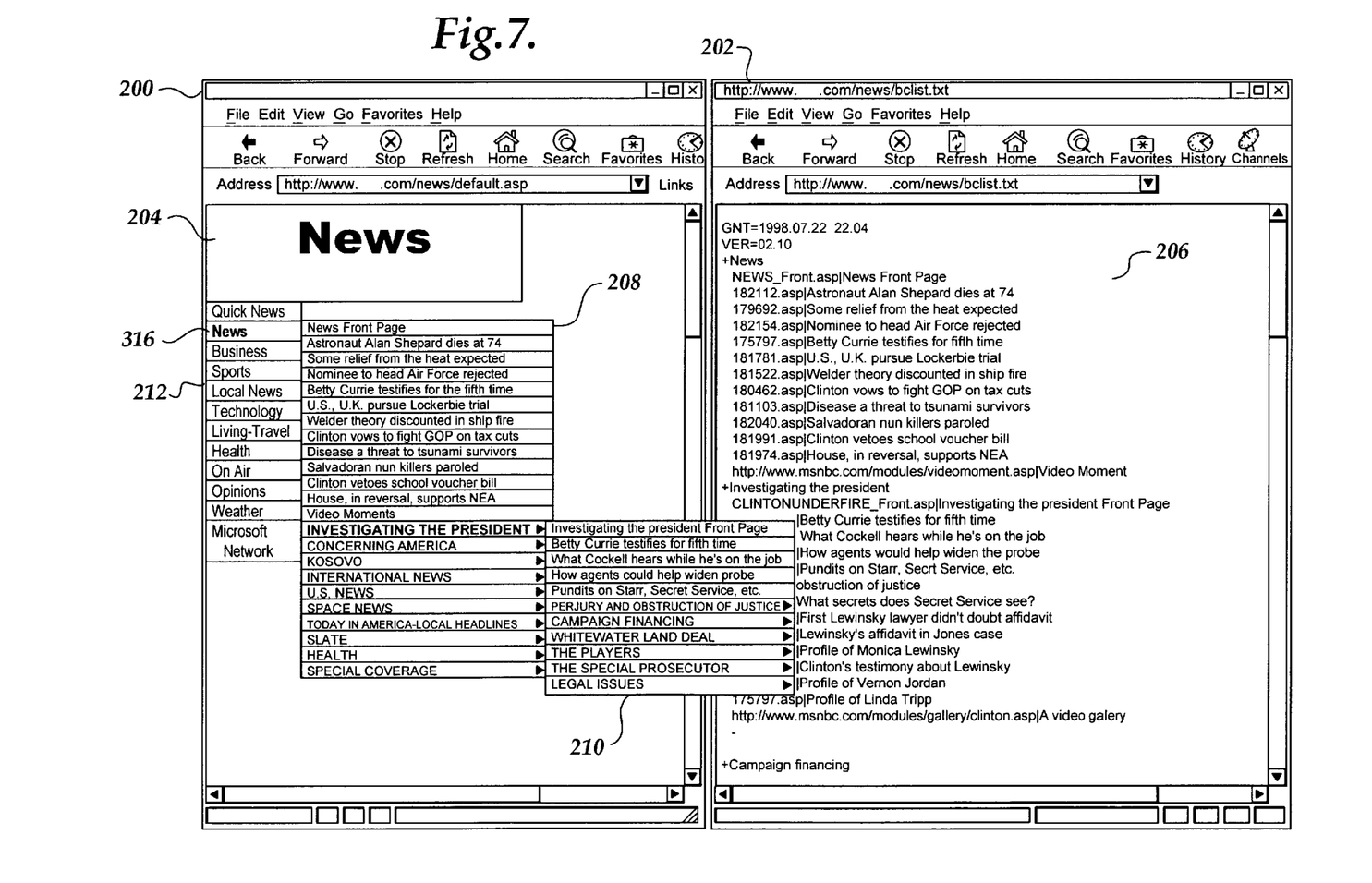
FIG. 7 is a screen shot of cascading menus generated by a web site's site browser and the datafile used by the site browser.

FIG. 7 is a screen shot of a window-based operating system's desktop (not shown) that includes side-by-side windows 200 and 202 that display two web pages 204 and 206, respectively. The first web page 204 is the home page of a news web site. The news web site includes text, graphics and an interactive left-to-right cascading menus that are created by a downloaded site browser and corresponding datafile. Two sections 208 and 210 of the cascading menus are displayed overlaying the windows 200 and 202. The sections 208 and 210 originate from a set of menu buttons 212 that are displayed in a designated location on the web page 204. Each menu button identifies a major topic area that most likely will include links to numerous web pages and also include a number of subtopics. The numerous web pages and subtopics of a menu button are presented to a user in the menus that cascade from the set of buttons 212. The list of menu buttons 212 and their designated location on the web page 204 preferably remain the same for all the web pages in the news web site that are instructed to display the set of menu buttons 212.

The cascading menus include two types of line items. The first type of line item is a title of a web page. The title is hyperlinked to the associated web page. The second type of line item is a titled pointer to another section. The titled pointer does not provide hyperlinking to a web page. The first and second interactive components are both activated when a mouse controlled cursor overlays the area occupied by the line item. The list of buttons 212 are preferably vertically stacked and located on the left side of the web pages to provide user friendly interaction and effective use the display space.

The cascading menus are generated by the site browser based on the contents of the datafile. The site browser makes API calls to the windows-based operating system on the user's system based on the structure and contents of a datafile. These API calls request the generation of cascading menus and are similar to the API calls other application programs make in order to make menus for the windows presenting those application programs.

The second web page 206 illustrates the datafile used by the site browser to generate the cascading menus shown in the first web page 204. When an author completes a web page and it has been review by the editors, its address and title are saved into a datafile by the author, the editor or a publisher using web publishing software. When all the web pages are complete with addresses and titles properly saved in the datafile, the datafile is given a timestamp. The author, editor or publisher also have the ability to change the site browser. If the site browser is changed a new version identifier is assigned to the changed site browser. Then, the new version identifier and timestamp are appended to all the web pages of the web site. Therefore, when one of the web pages with the appended new version identifier and timestamp is downloaded, the new site browser and datafile will be implemented if they haven't already.

The datafile is structured in a tree-like manner in order to allow the site browser to easily comprehend the structure of the web site. The datafile identifies when a menu begins and ends and the associated button or item in a previous menu. A menu includes two types of interactive items. The first interactive item is a heading that is hyperlinked to a web page. The second interactive item is a heading that is hyperlinked to another menu. Within the datafile new menus are identified by the lines beginning with a '+'. The text next to the '+' is included as the heading in a second interactive item. The end of a menu is identified by a '−'. Between the '+' and '−' are lines with information for generating first interactive items. Each of these lines are identified by a space followed by an address (i.e., URL) that is followed by a headline. For example, the news front page is headlined "News Front Page" and the address is NEWS_FRONT.asp. Addresses in the file may either be fully defined URLs, which can point to any page on any web server, or relative URLs, which refer to pages in a default directory. Lines 220–230 include examples of the first address type and line 240 includes an example of the standard URL address type. Other address types may be used provided the site browser has the ability to read the address type. Because the datafile has been organized in the tree-like manner described above removing the need to specify redundant information and specifying items in a more compact notation than in the prior art, it occupies a great deal less space, and provides better downloading performance.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A method of navigating through a web site downloaded from server, wherein the web site includes a plurality of web pages, said method comprising:
   requesting a web page of the plurality of web pages;
   receiving from the server the requested web page;
   receiving from the server a software component and a datafile, wherein the software component comprises display instructions, and wherein the datafile is a tree-like structure comprising titles of the web site's web pages and links to the titled web pages;
   filling a section of a cascading menu based on the display instructions and the datafile when a portion of said datafile corresponding to said section of said cascading menu has been received; and
   making said filled section of said cascading menu available to a user as soon as the section is filled while an additional portion of said datafile is received.

2. The method of claim 1, wherein said filled section of said cascading menu comprises at least one item linked to a web page of the web site.

3. The method of claim 1, wherein said filled section of said cascading menu comprises at least one item linked to another menu of said filled section of said cascading menu.

4. A system for navigating through a web site downloaded from a server, wherein the web site includes a plurality of web pages, said system comprising:
   a) a user interface component for requesting a web page of the plurality of web pages;
   b) a processing component coupled to the user interface component and the server, said processing component comprising:
      i) a first component for receiving from the server the requested web page;
      ii) a second component for receiving from the server a software component and a datafile, wherein the software component comprises display instructions, and wherein the datafile is a tree-like structure comprising titles of the web site's web pages and links to the titled web pages; and
      iii) a third component for filling a section of a cascading menu based on the display instructions and the datafile when a portion of said datafile has been received corresponding to said section of said cascading menu; and
   c) a display device coupled to the processing component for making said filled section of said cascading menu available to a user as soon as the section is filled and displaying said filled section of said cascading menu in response to user interface commands while an additional portion of said datafile is received.

5. The system of claim 4, wherein said filled section of said cascading menu comprises at least one item linked to a web page of the web site.

6. The system of claim 4, wherein said filled section of said cascading menu comprises at least one item linked to another menu of said filled section of said cascading menu.

7. A computer readable medium for navigating through a web site downloaded from a server, wherein the web site includes a plurality of web pages, said computer readable medium comprising:

a) a user interface component for requesting a web page of the plurality of web pages; and b) a processing component coupled to the user interface component and the server; said processing component comprising:

i) a first component for receiving from the server the requested web page;

ii) a second component for receiving from the server a software component and a datafile, wherein the software component comprises display instructions, and wherein the datafile is a tree-like structure comprising titles of the web site's web pages and links to the titled web pages; and iii) a third component for filling a section of a cascading menu based on the display instructions and the datafile when a portion of the datafile corresponding to the section of the cascading menu has been received and making said filled section of said cascading menu available to a user as soon as the section is filled and while an additional portion of the datafile is being received.

8. The computer readable medium of claim 7, wherein said filled section of said cascading menu comprises at least one item linked to a web page of the web site.

9. The computer readable medium of claim 7, wherein said filled section of said cascading menu comprises at least one item linked to another menu of said filled section of said cascading menu.

10. A method of navigating through a web site downloaded from a server, wherein the web site includes a plurality of web pages, said method comprising:

requesting a web page of the plurality of web pages;

receiving from the server the requested web page;

updating a software component and datafile for the web site of the received web page; and filling a section of a cascading menu based on the updated software component and datafile and making said filled section of said cascading menu available to a user as soon as a portion of said datafile corresponding to said section of said cascading menu is received and while an additional portion of said datafile is received.

11. The method of claim 10, wherein said web page further comprises a software component version identifier and a datafile timestamp.

12. The method of claim 11, wherein updating further comprises:

determining if the received version identifier is more current than a version identifier of a previously received software component, if the received version identifier is more current than the version identifier of the previously received software component, receiving a software component associated with the received version identifier and receiving a datafile associated with the received software component, if the received version identifier is not more current than the version identifier of the previously received software component, determining if the received timestamp is more current than the timestamp of a previously received datafile, and if the received timestamp is more current than the timestamp of the previously received datafile, receiving a new datafile associated with the received timestamp.

13. The method of claim 10, further comprising:

determining if a software component with version identifier was previously received for the received web page;

if it was determined that a software component was not previously received, receiving from the server a software component with a version identifier attached to the received web page, wherein the software component comprises display instructions, and receiving from the server a datafile with a timestamp attached to the received web page, wherein the datafile is a tree-like structure comprising titles of the web site's web pages and links to the titled web pages; and if it was determined that a software component was previously received, perform the updating.

14. A computer readable medium for performing the method of claim 10.

15. A computer readable medium for performing the method of claim 11.

16. A computer readable medium for performing the method of claim 12.

17. A computer readable medium for performing the method of claim 13.

18. A system for navigating through a web site downloaded from a server, wherein the web site includes a plurality of web pages, said system comprising:

a) a user interface component for requesting a web page of the plurality of web pages;

b) a processing component coupled to the user interface component and the server; said processing component comprising:

i) a first component for receiving from the server the requested web page;

ii) a second component for updating a software component and datafile for the web site of the received web page; and iii) a third component for filling a section of a cascading menu based on the updated software component and datafile when a portion of said datafile is received corresponding to said section of said cascading menu; and c) a display device coupled to the processing component for making said filled section of said cascading menu available to a user as soon as the section is filled while an additional portion of said datafile is received in response to user interface commands.

19. The method of claim 18, wherein the first component receives a software component version identifier and a datafile timestamp.

20. The system of claim 19, wherein the second component further comprises:

a) a version identifier determining component for determining if the received version identifier is more current than the version identifier of the previously received software component, the version identifier determining component comprising:

b) a first receiving component for receiving a software component associated with the received version identifier and receiving a datafile associated with the received software component, if the version identifier determining component determined that the received version identifier is more current than the version identifier of the previously received software component, and c) a timestamp determining component for determining if the received timestamp is more current than the timestamp of a previously received datafile, if the version identifier determining component determined that the received version identifier is not more current than the version identifier of the previously received software component;

d) a datafile receiving component for receiving a new datafile associated with the received timestamp, if the timestamp determining component determined that the received timestamp is more current than the timestamp of the previously received datafile.

21. The system of claim 18, wherein the processing component further comprises:

a) a determining component for determining if a software component with version identifier was previously received for the received web page;

b) a software component receiving component for receiving from the server a software component with a version identifier corresponding to the version identifier attached to the received web page, if the determining component determines that a software component has not been previously received; and c) a datafile receiving component for receiving from the server a datafile with a timestamp corresponding to the timestamp attached to the received web page, wherein the datafile is a tree-like structure comprising titles of the web site's web pages and links to the titled web pages, if the determining component determined that a software component was not previously received.

22. A computer readable medium for performing the method of claim 18.

23. A computer readable medium for performing the method of claim 19.

24. A computer readable medium for performing the method of claim 20.

25. A computer readable medium for performing the method of claim 21.

26. A method of navigating through a web site comprising a plurality of web pages, comprising:

receiving a request for one of said plurality of web pages;

in response to said request, transmitting a software component and a datafile, and wherein the software component comprises display instructions for filling a section of a cascading menu based on said display instructions and said datafile and making said filled section of said cascading menu available to a user as soon as a portion of said datafile corresponding to said section of said cascading menu has been received and while an additional portion of said datafile is received, and wherein said datafile is a tree-like structure comprising titles of said web pages and links to the said web pages.

27. The method of claim 26, wherein said software component further comprises a software component version identifier and wherein said datafile further comprises a datafile timestamp.

28. The method of claim 27, wherein said one of said plurality of web pages further comprises a site browser version identifier and a datafile timestamp.

29. The method of claim 28, wherein said request further comprises a datafile timestamp.

30. The method of claim 29, further comprising:

comparing said datafile timestamp received with said request to said datafile timestamp associated with said one of said plurality of web pages to determine whether the datafile timestamp associated with said one of said plurality of web pages is more current than said datafile timestamp received with said request; and transmitting said datafile in response to determining that said datafile timestamp associated with said one of said plurality of web pages is more current than said datafile timestamp received with said request.

31. A computer-readable medium, containing computer-executable instructions which, when executed by a computer, perform the method of claim 26.

32. A computer-readable medium, containing computer-executable instructions which, when executed by a computer, perform the method of claim 27.

33. A computer-readable medium, containing computer-executable instructions which, when executed by a computer, perform the method of claim 28.

34. A computer-controlled apparatus for performing the method of claim 26.

35. A computer-controlled apparatus for performing the method of claim 27.

36. A computer-controlled apparatus for performing the method of claim 28.

* * * * *

UNITED STATES PATENT AND TRADEMARK OFFICE
CERTIFICATE OF CORRECTION

PATENT NO. : 6,256,028 B1
DATED : July 3, 2001
INVENTOR(S) : J.L. Sanford et al.

It is certified that error appears in the above-identified patent and that said Letters Patent is hereby corrected as shown below:

Title page,
Item [57], ABSTRACT, "updated, if" should read -- updated if --

Column 1,
Line 55, "has be shown" should read -- has been shown --

Column 2,
Lines 48-49, "times-tamp" should be hyphenated -- time-stamp --
Line 54, "containing datafile" should read -- containing a datafile --

Column 3,
Line 64, "that helps" should read -- that help --

Column 6,
Line 14, "(hereinafter sections and menus are used" should read -- (hereinafter "sections" and "menus" are used --
Line 24, "block 116, is" should read -- block 116 is --
Line 37, "compared, to" should read -- compared to --
Line 42, "onto" should read -- on to --
Line 59, "and an interactive" should read -- and interactive --

Column 7,
Line 5, "news" should read -- new --
Line 17, "the display space." should read -- of the display space. --
Line 29, "review" should read -- reviewed --
Line 34, "have the ability" should read -- has to ability --
Lines 39-40, "times-tamp" should be hyphenated -- time-stamp --
Line 41, "haven't already" should read -- haven't already been implemented --
Line 54, "Each of these lines are" should read -- Each of these lines is --

Column 8,
Line 11, "from server," should read -- from a server, --

Column 9,
Lines 62-63, "times-tamp" should be hyphenated -- time-stamp --
Lines 65-66, "times-tamp" should be hyphenated -- time-stamp --

UNITED STATES PATENT AND TRADEMARK OFFICE
CERTIFICATE OF CORRECTION

PATENT NO.   : 6,256,028 B1
DATED        : July 3, 2001
INVENTOR(S)  : J.L. Sanford et al.

It is certified that error appears in the above-identified patent and that said Letters Patent is hereby corrected as shown below:

Column 10,
Line 65, "component, and" should read -- component; --
Line 67, "times-" should read -- time- --

Column 11,
Line 1, "tamp" should read -- stamp --
Line 6, "component;" should read -- component; and --

Signed and Sealed this

Seventh Day of May, 2002

*Attest:*

*Attesting Officer*

JAMES E. ROGAN
*Director of the United States Patent and Trademark Office*